US012591472B2

(12) United States Patent  (10) Patent No.: US 12,591,472 B2
Charlson et al.  (45) Date of Patent: Mar. 31, 2026

(54) SYSTEM AND METHOD FOR NON-DISRUPTIVE SYSTEM ENHANCEMENTS AND INTEGRATIONS

(71) Applicant: Battelle Memorial Institute, Columbus, OH (US)

(72) Inventors: David Charlson, Columbus, OH (US); Matthew Cline, Grove City, OH (US); Benjamin Cote, Powell, OH (US); Joseph Flanagan, Abingdon, MD (US); Todd Hitt, Worthington, OH (US); Jim Risser, Lutherville Timonium, MD (US); Kileen Ruff, Mechanicsburg, OH (US); Michael Woudstra, Severn, MD (US); Greg Zink, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 18/166,543

(22) Filed: Feb. 9, 2023

(65) Prior Publication Data

US 2023/0251917 A1  Aug. 10, 2023

Related U.S. Application Data

(60) Provisional application No. 63/308,156, filed on Feb. 9, 2022.

(51) Int. Cl.
| | |
|---|---|
| *G06F 9/54* | (2006.01) |
| *G06F 9/50* | (2006.01) |
| *G06Q 10/10* | (2023.01) |
| *G06Q 10/105* | (2023.01) |
| *G06Q 10/20* | (2023.01) |

(52) U.S. Cl.
CPC ............ *G06F 9/542* (2013.01); *G06F 9/5077* (2013.01); *G06Q 10/103* (2013.01); *G06Q 10/105* (2013.01); *G06Q 10/20* (2013.01)

(58) Field of Classification Search
CPC .. G06Q 10/105; G06Q 10/0087; G06Q 10/06; H04L 41/0869; H04L 63/104; H04L 67/06; G06F 16/168
See application file for complete search history.

(56) References Cited

U.S. PATENT DOCUMENTS

| | | | |
|---|---|---|---|
| 8,731,692 | B2 | 5/2014 | Herrmann et al. |
| 9,979,729 | B2 | 5/2018 | Unterschuetz |

(Continued)

*Primary Examiner* — Barbara B Anyan
(74) *Attorney, Agent, or Firm* — Grossman, Tucker, Perreault & Pfleger, PLLC; Donald J. Perreault

(57) ABSTRACT

In an approach to non-disruptive system enhancements and integrations, the system including: one or more computer processors; one or more computer readable storage media; and program instructions stored on the one or more computer readable storage media for execution by at least one of the one or more computer processors. The stored program instructions including instructions to: connect one or more devices to the system, wherein each device of the one or more devices is connected to the system without changing a baseline system code; assign a mode to each device; receive an event from any device of the one or more devices; determine whether each user of one or more users of the system has an appropriate privilege; and send the event to each user of the one or more users that has the appropriate privilege.

20 Claims, 7 Drawing Sheets

100

(56)　　　　　　References Cited

U.S. PATENT DOCUMENTS

| | | | | |
|---|---|---|---|---|
| 10,091,270 | B2 | 10/2018 | Fang | |
| 10,136,296 | B1* | 11/2018 | Dames | H04W 4/90 |
| 2003/0078861 | A1* | 4/2003 | Hoffman | G06Q 10/06 |
| | | | | 705/28 |
| 2006/0259244 | A1 | 11/2006 | Case | |
| 2010/0162383 | A1* | 6/2010 | Linden | H04L 41/0893 |
| | | | | 726/13 |
| 2014/0025883 | A1* | 1/2014 | Patzelt | G06F 12/14 |
| | | | | 711/108 |
| 2016/0323508 | A1* | 11/2016 | Ayalasomayajula | |
| | | | | H04N 23/6812 |
| 2018/0150650 | A1* | 5/2018 | Saunders | H04L 63/104 |
| 2019/0129968 | A1* | 5/2019 | Neylan | G06F 16/168 |
| 2020/0378808 | A1 | 12/2020 | Platonov et al. | |
| 2021/0248556 | A1* | 8/2021 | Venkatraman | G06Q 10/103 |
| 2022/0027856 | A1* | 1/2022 | Piaskowski | G06Q 10/105 |
| 2022/0103566 | A1* | 3/2022 | Faulkner | H04L 67/06 |
| 2023/0135553 | A1* | 5/2023 | Cella | G06N 20/10 |
| 2023/0297095 | A1* | 9/2023 | Oelke | G05B 23/024 |
| | | | | 702/182 |
| 2024/0166168 | A1* | 5/2024 | Hong | G06Q 10/20 |

* cited by examiner

SYSTEM AND METHOD FOR NON-DISRUPTIVE SYSTEM ENHANCEMENTS AND INTEGRATIONS

CROSS-REFERENCE TO RELATED APPLICATIONS

The present application claims the benefit of the filing date of U.S. Provisional Application Ser. No. 63/308,156, filed Feb. 9, 2022, the entire teachings of which application is hereby incorporated herein by reference.

STATEMENT REGARDING FEDERALLY SPONSORED RESEARCH OR DEVELOPMENT

The present invention was made with the United States Government support, under Contract No. DHS G32330—DHS Facilities 5 yr Maint 70QS0320000000005 CON00032330. The Government has certain right in this invention.

TECHNICAL FIELD

The present application relates generally to data processing systems and, more particularly, to a system and method for non-disruptive system enhancements and integrations.

BACKGROUND

A monitoring and control system is software that helps system administrators monitor and control their infrastructure. These tools monitor system devices, traffic, and applications, and generate events and notifications when malfunctions and disruptions occur. Industrial monitoring refers to the collection and analysis of essential industrial data and statistics related to processes, assets and devices used in the industrial premises to improve productivity and quality.

Artificial intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving. Machine learning is a form of artificial intelligence that makes predictions from data.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
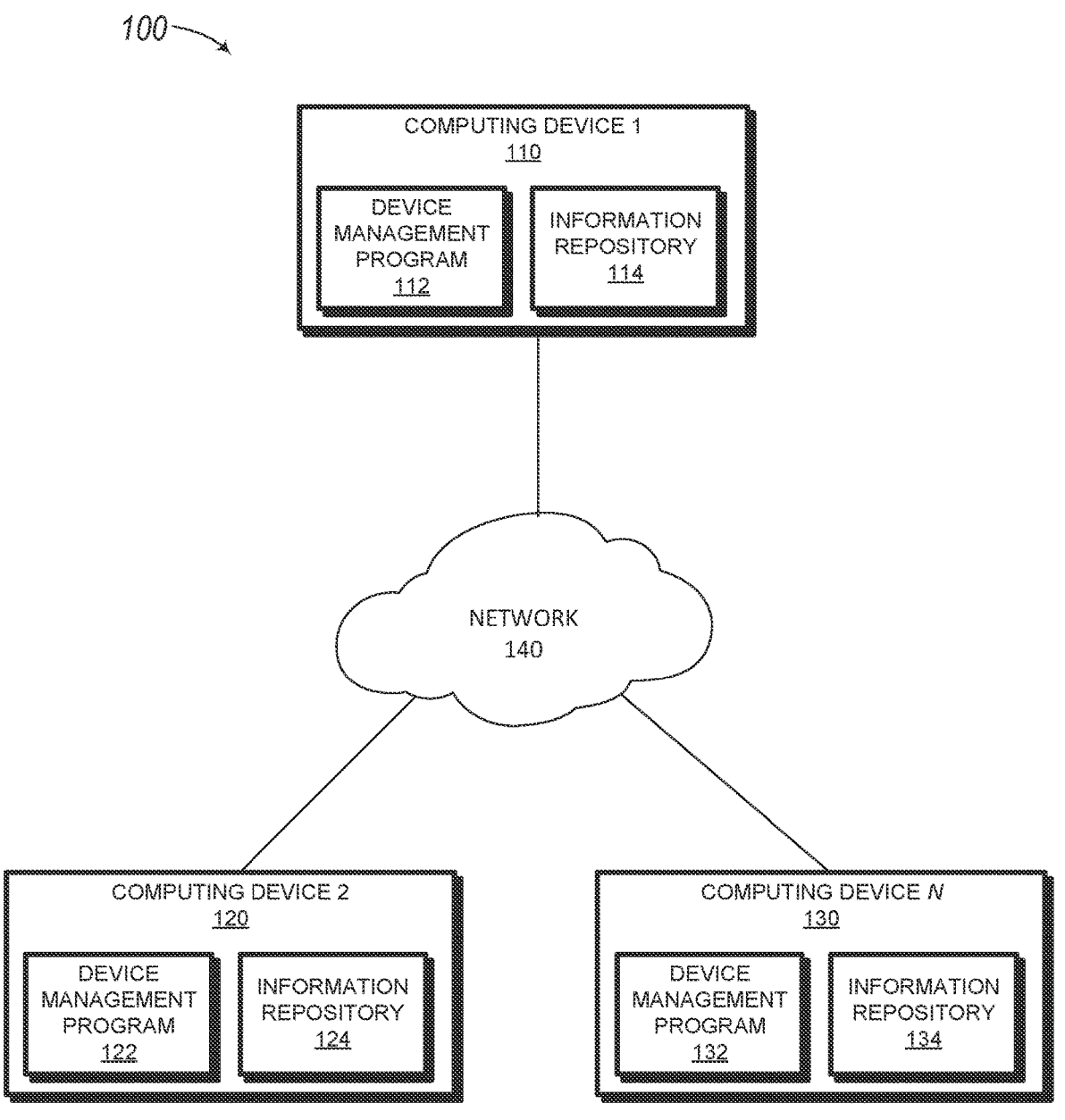
FIG. 1 is a functional block diagram illustrating a distributed data processing environment, in accordance with an embodiment of the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Many systems exist that integrate disparate devices into a single cohesive system. This is typically accomplished by a single system integrator in charge of all code development. The system integrator utilizes whatever programming interface that each vendor supplies and writes custom logic to communicate with the device. There are, however, problems associated with these systems. The first problem addressed herein is that any changes to the device or interface are potentially breaking, necessitating the integrator to constantly update the interface code to support any vendor changes.

The system disclosed herein may include any device that may be monitored and/or controlled in a system. Some non-limiting examples of devices may include sensors, e.g., temperature sensors, humidity sensors, Chemical, Biological, Radiological, Nuclear, and Explosives (CBRNE) sensors, etc., but can also include conceptual sensors such as cameras, audio monitors, etc. In addition, the term device may include virtual interfaces to devices, such as a virtual interface to allow plug and play connection of a physical device, as well as modifications to devices already installed in the monitoring system. Some examples of the elements that the system can control may include, but are not limited to, airflow control devices such as fans, pumps, valves, etc.

The system disclosed herein is an integrated system that allows non-disruptive system enhancements through the ability to add or modify devices without recompiling baseline system code. Most integrated systems are accomplished using custom interface code, specifically written against each vendor's programming interface. The disclosed approach is written with custom anonymous "payload" sections allowing a vendor to add an unlimited number of settings for each device.

The disclosed system allows users to add their devices to the system without any code modifications to the code base.

To accomplish this some areas addressed may include device definitions, settings, and data payload. For the device definition, a device (including a device/identifier) is defined using metadata to describe the input and output capabilities of the device along with all settings and commands for the device. This metadata is registered to the core system so that the device dynamically appears in the user interface where it can be instantiated. Each device has settings specific to it, and the system utilizes a custom "settings payload" section that allows users to add an unlimited number of settings for each device. For the data payload, each device can configure any amount of data that can be displayed on the user interface of a client. For the data payload, special metadata properties allow marking of specific data that are used to identify the device.

A second problem encountered with current systems is that most integrated systems have two weaknesses in their design: they do not allow for real time maintenance of connected devices without the necessity of taking them out of the system, either by setting them offline or by removing them from the system configuration; and there is no means to prototype a new device without it negatively affecting the rest of the system. For instance, any alarms, faults, or warnings will propagate through most systems and therefore must be addressed by all users.

Figure 2A:
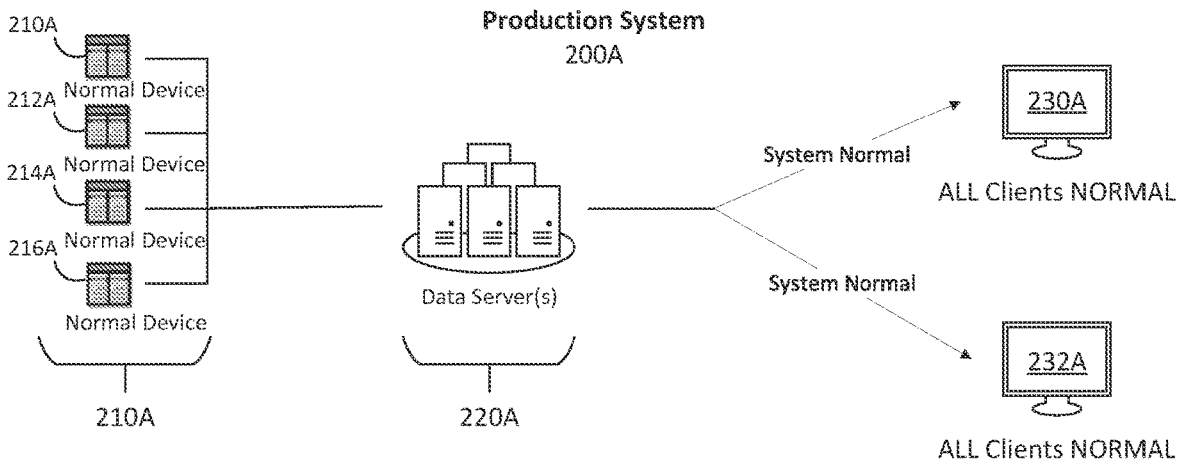
FIGS. 2A-2B are an example of an existing monitoring system.
Figure 2B:
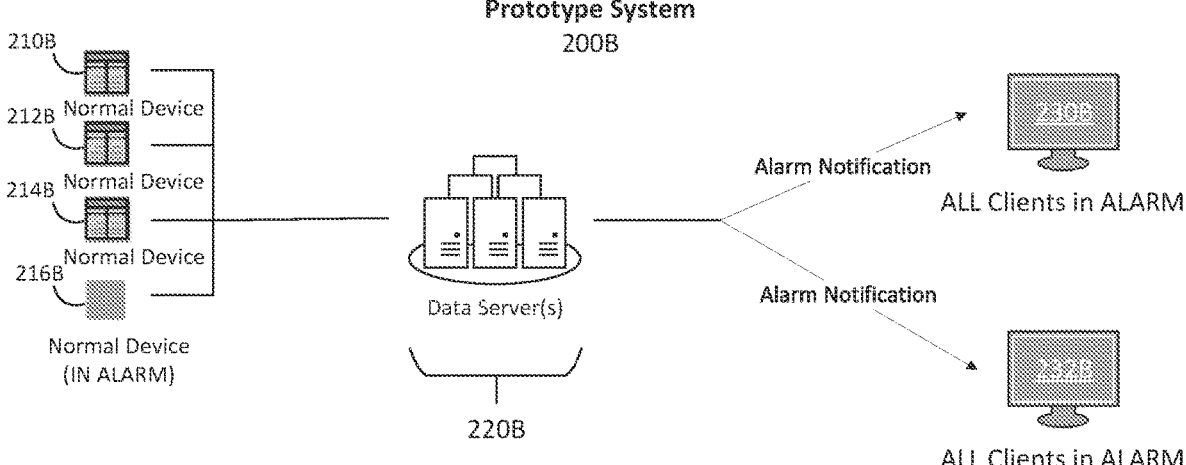

FIGS. 2A-2B are an example of an existing monitoring system that exhibits the problem noted above. In the example of FIG. 2A, the illustration depicts a typical fielded production system 200A. In this example, devices 210A, 212A, 214A, and 216A are all normal devices operating in a normal mode in production system 200A. Servers 220A represent the one or more server computers that are controlling the system. The servers 220A send information from devices 210A-210D to client 230A and client 232A and send information from clients 230A-232A to devices 210A-210D. Since all data from the servers 220A are sent to all clients 210A-210D, if a new device is added to production system 200A, then any faults or alarms generated by the new client would be sent by servers 220A to all clients 210A-210D, and the users of clients 210A-210D would all receive the faults and alarms, disrupting normal operations. In order to add new devices to the system, it is therefore necessary to construct two entire systems, one for production, and one for prototyping/field testing.

To avoid the problem of any faults or alarms generated by a new client being sent all clients, the example illustrated in FIG. 2B represents the prototype system 200B used to configure and test new devices. Here, as in the example production system of FIG. 2A, devices 210B, 212B, and 214B are normal devices that have been integrated into prototype system 200B, while device 216B is a normal device that is in an alarm state. Servers 220B are the one or more server computers that are controlling the system, and client 230B and client 232B are the clients attached to the prototype system 200B. In the example of FIG. 2B, however, the clients 230B-232B are test clients since the prototype system 200B must be isolated from the production system 200A. This is expensive, cumbersome and time consuming. In addition, if a device requires maintenance, either the production system 200A must be taken offline to provide the maintenance, or the device requiring maintenance must be removed from the production system 200A and moved to the prototype system 200B.

The system disclosed herein is an integrated system that allows both maintenance activities and integration efforts on a live system without disruption to the running system and with only appropriate users aware of device information and events and notifications (e.g., alarms, faults, warnings, etc.). The disclosed system allows both maintenance activities and integration efforts to be performed in real time on the running system and allows for continued detection/protection while performing the maintenance and integration activities. The disclosed system is a hybrid system which allows a prototype device to be added directly to the production system.

This is accomplished by adding roles/privileges, modes, and events to the users and devices within the system. Each user is assigned a set of privileges, where each privilege spells out a basic capability (i.e., the user can acknowledge alarms, add other users, etc.). These privileges can be aggregated into roles (e.g., BasicUser, Admin, Integration, Maintenance, etc.). The disclosed system leverages this concept to create an Integration role. This Integration role, combined with Modes and Events described below enable the hybrid system described above.

Each device is assigned a mode and may have metadata tags attached to it helping describe the behavior and use of the device. In one example system, the modes may be "Normal, Integration, and Maintenance." Devices can be put into any of these modes at any time by users with appropriate permission. When the device mode changes, a decision engine makes changes to the system and controls what each user experiences.

In some embodiments of the disclosed system, the decision engine uses artificial intelligence (AI) to determine which changes should be made to the system and what each user experiences. For example, if a device sends a prioritized event and the decision engine forwards that prioritized event, but a user with appropriate privileges determines that the prioritized event is not of high priority. The AI engine will learn that the conditions leading to this event is not of a high priority, and therefore will no longer elevate its priority. In some embodiments, the AI used may be machine learning (ML). In other embodiments the AI used may be neural networks.

Any change in the system can cause an event (e.g., device turned online, user logged in, pump failure, etc.). Events may carry metadata tags telling what mode the device that caused the event is in. This allows the decision engine to properly assimilate the data and disseminate it appropriately.

In addition to allowing for integration of devices into the system, the disclosed system include a Maintenance Mode. The Maintenance Mode works precisely like the integration mode above; however, it is targeted toward production devices. Once a device is fielded it can be taken out of integration mode and set to normal. If, however, the device becomes unstable, typical systems must set the device "offline" or take it out to the system entirely. The disclosed hybrid system will allow the device to continue to be deployed while in reduced capability. The device is set in "Maintenance mode" and only users with, for example, a Maintenance role will see it. The device can still provide information in whatever reduced capacity it can perform while it is being maintained/repaired. This provides enhanced capabilities over a typical system. Another example of maintenance mode is scheduled calibration and testing of equipment, where devices may be subject to stimulus that causes an alarm, fault, warning, etc. to test the integrity of the device and response by the system.

Figure 3:
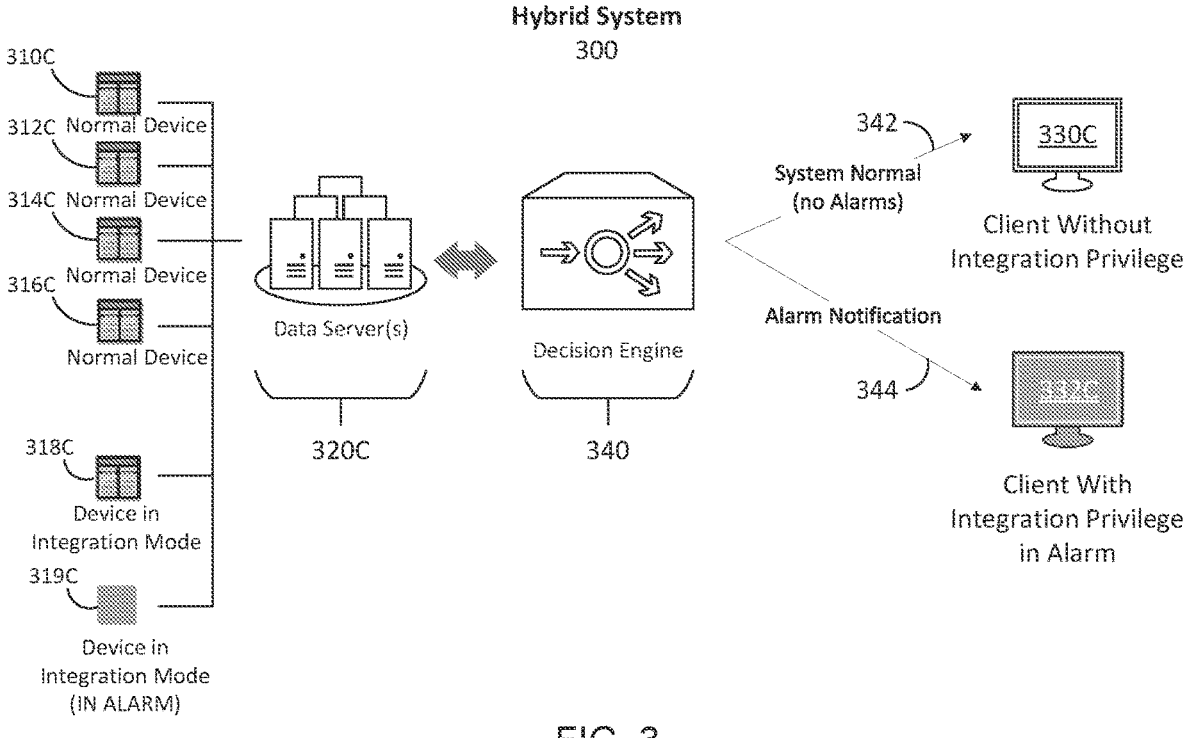
FIG. 3 is an example of a monitoring system with device management for non-disruptive system enhancements and integrations, in accordance with an embodiment of the present disclosure.

FIG. 3 is an example of a monitoring system with device management for non-disruptive system enhancements and integrations, in accordance with an embodiment of the present disclosure. The example illustrated in FIG. 3 represents only one possible example hybrid system 300. Many other possible embodiments of hybrid system 300 are possible, as would be apparent to a person of skill in the art.

As in the examples of FIGS. 2A-2B, the example system of FIG. 3 includes normal devices 310C, 312C, 314C, and 316C. This example, however, also includes device 318C, which is a device in integration mode, and device 319C, which is a device in integration mode that is also in an alarm condition. As in the examples of FIGS. 2A-2B, the example system of FIG. 3 includes servers 320C and clients 330C and 332C. In this system, a decision engine 340 determines the appropriate state for the system to display for each individual client and device based on a set of roles or privileges. A user with appropriate privilege will see the device in the user interface and will be notified when warnings, faults and alarms occur. User lacking the appropriate privilege will not even know that the prototype sensor exists. It will not display on the user interface and any notifications or events will be withheld for that user. Additionally, the "aggregate status" will be calculated for each user base on privilege. Users without integration privilege will see "system normal" even when prototype sensors are alarmed. Decision engine 340 provides for communications back to the servers 320C and devices 310C-319C.

In the example of FIG. 3, client 332C is a client with Integration privilege, and therefore alarm notification 344, caused by device 319C in the alarm condition, is sent to client 332C. Client 330C, however, does not have the integration privilege, and therefore only normal system notifications 342 are sent to client 330C. Unlike the system of FIGS. 2A and 2B above, even though device 319C is a device being added to the system that is causing alarms, because the alarms are not sent to users without the Integration privilege, client 330C is undisturbed by the alarms.

FIG. 1 is a functional block diagram illustrating a distributed data processing environment, generally designated 100, suitable for operation of the device management program 112 in accordance with at least one embodiment of the present disclosure. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 100 includes computing device-1 110, computing device-2 120, and computing device-N 130 all optionally connected to network 140. While the illustrated example distributed processing environment 100 shows three computing devices, the actual system may have any number of computing devices attached via network 140.

Network 140 can be, for example, a telecommunications network, a local area network (LAN), a wide area network (WAN), such as the Internet, or a combination of the three, and can include wired, wireless, or fiber optic connections. Network 140 can include one or more wired and/or wireless networks that are capable of receiving and transmitting data, voice, and/or video signals, including multimedia signals that include voice, data, and video information. In general, network 140 can be any combination of connections and protocols that will support communications between computing device-1 110, computing device-2 120, computing device-N 130 and other computing devices (not shown) within distributed data processing environment 100.

Computing device-1 110, computing device-2 120, and computing device-N 130 can each be a standalone computing device, a management server, a web server, a mobile computing device, or any other electronic device or computing system capable of receiving, sending, and processing data. In embodiment, computing device-1 110, computing device-2 120, and computing device-N 130 can each be a laptop computer, a tablet computer, a netbook computer, a personal computer (PC), a desktop computer, a smart phone, or any programmable electronic device capable of communicating with other computing devices (not shown) within distributed data processing environment 100 via network 140. In another embodiment, computing device-1 110, computing device-2 120, and computing device-N 130 can each represent a server computing system utilizing multiple computers as a server system, such as in a cloud computing environment. In yet another embodiment, computing device-1 110, computing device-2 120, and computing device-N 130 each represents a computing system utilizing clustered computers and components (e.g., database server computers, application server computers) that act as a single pool of seamless resources when accessed within distributed data processing environment 100.

In an embodiment, computing device-1 110, computing device-2 120, and computing device-N 130 includes the device management program 112. In an embodiment, the device management program 112 is a program, application, or subprogram of a larger program for system and method for non-disruptive system enhancements and integrations. In an alternative embodiment, the device management program 112 may be located on any other device accessible by computing device-1 110, computing device-2 120, and computing device-N 130 via network 140.

In an embodiment, computing device-1 110, computing device-2 120, and computing device-N 130 includes information repository 114. In an embodiment, information repository 114 may be managed by the device management program 112. In an alternate embodiment, information repository 114 may be managed by the operating system of the computing device-1 110, computing device-2 120, and computing device-N 130, alone, or together with, the device management program 112. Information repository 114 is a data repository that can store, gather, compare, and/or combine information. In some embodiments, information repository 114 is located externally to computing device-1 110, computing device-2 120, and computing device-N 130 and accessed through a communication network, such as network 140. In some embodiments, information repository 114 is stored on computing device-1 110, computing device-2 120, and computing device-N. In some embodiments, information repository 114 may reside on another computing device (not shown), provided that information repository 114 is accessible by computing device-1 110, computing device-2 120, and computing device-N 130. Information repository 114 includes, but is not limited to, device configuration data, server configuration data, client configuration data, system data, client data, device status data, machine learning training data, and other data that is received by the device management program 112 from one or more sources, and data that is created by the device management program 112.

Information repository 114 may be implemented using any non-transitory volatile or non-volatile storage media for storing information, as known in the art. For example, information repository 114 may be implemented with random-access memory (RAM), semiconductor memory, solid-state drives (SSD), one or more independent hard disk drives, multiple hard disk drives in a redundant array of independent disks (RAID), or an optical disc. Similarly, information repository 114 may be implemented with any suitable storage architecture known in the art, such as a relational database, an object-oriented database, or one or more tables.

Figure 4:
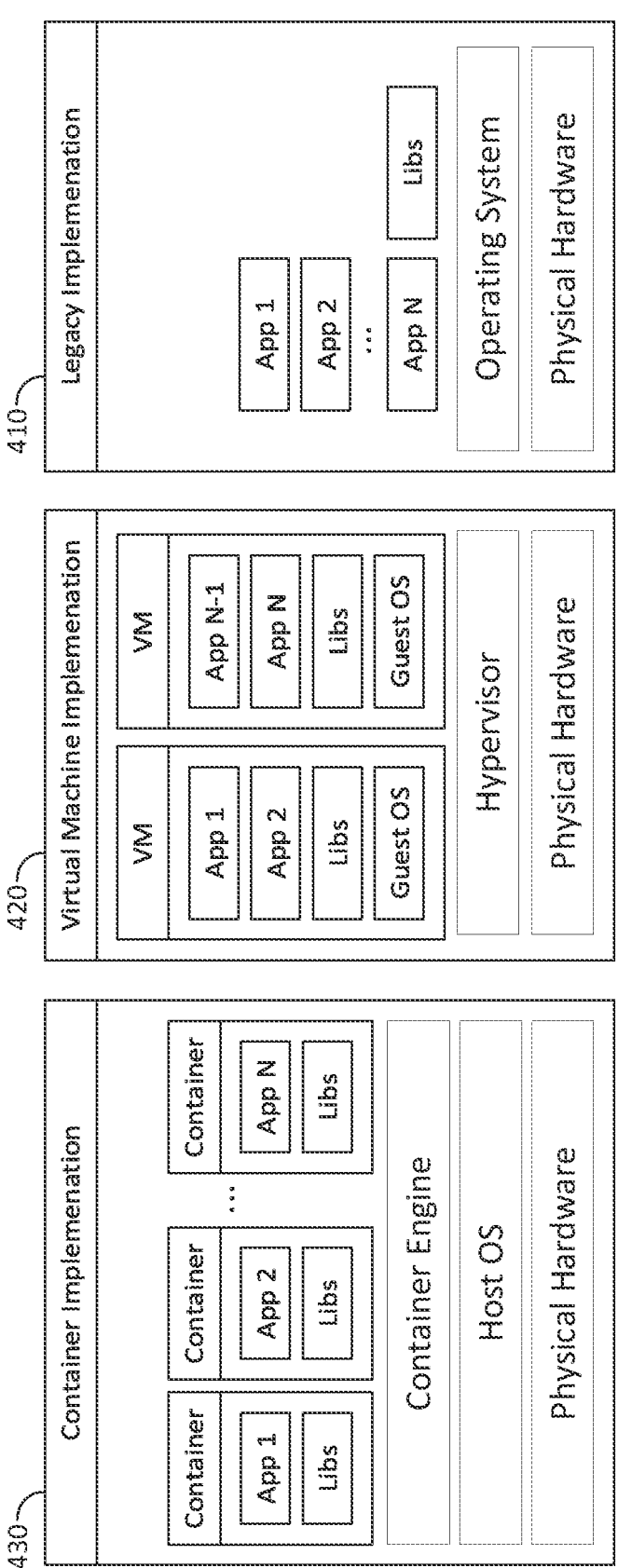
FIG. 4 illustrates example block diagrams of three possible architectures of the monitoring system with device management, in accordance with an embodiment of the present disclosure.

FIG. 4 illustrates example block diagrams of three possible architectures of the monitoring system with device management, in accordance with an embodiment of the present disclosure. FIG. 4 shows a legacy implementation 410, which is composed of one or more applications implemented on an operating system on physical hardware. The second possible implementation of the monitoring system with device management is virtual machine implementation 420. Here the application runs on an operating system in a virtual machine. The virtual machine runs on a hypervisor, which isolates the virtual machine from the physical hardware.

Another possible implementation of the monitoring system with device management is a container implementation 430, where the application is composed of containers that run on a container engine which in turn runs on a host operating system isolating the containers from the physical hardware. The container implementation 430 also includes a cluster management tool, which automatically creates, deploys, and scales containers. In the container implementation 430, if any server is detected to have gone down, the system will automatically mover all available connections to an active server.

The example illustrated in FIG. 4 represents only one possible system architecture. Many different system architectures to run the system herein disclosed are possible, as would be apparent to a person of skill in the art.

Figure 5:
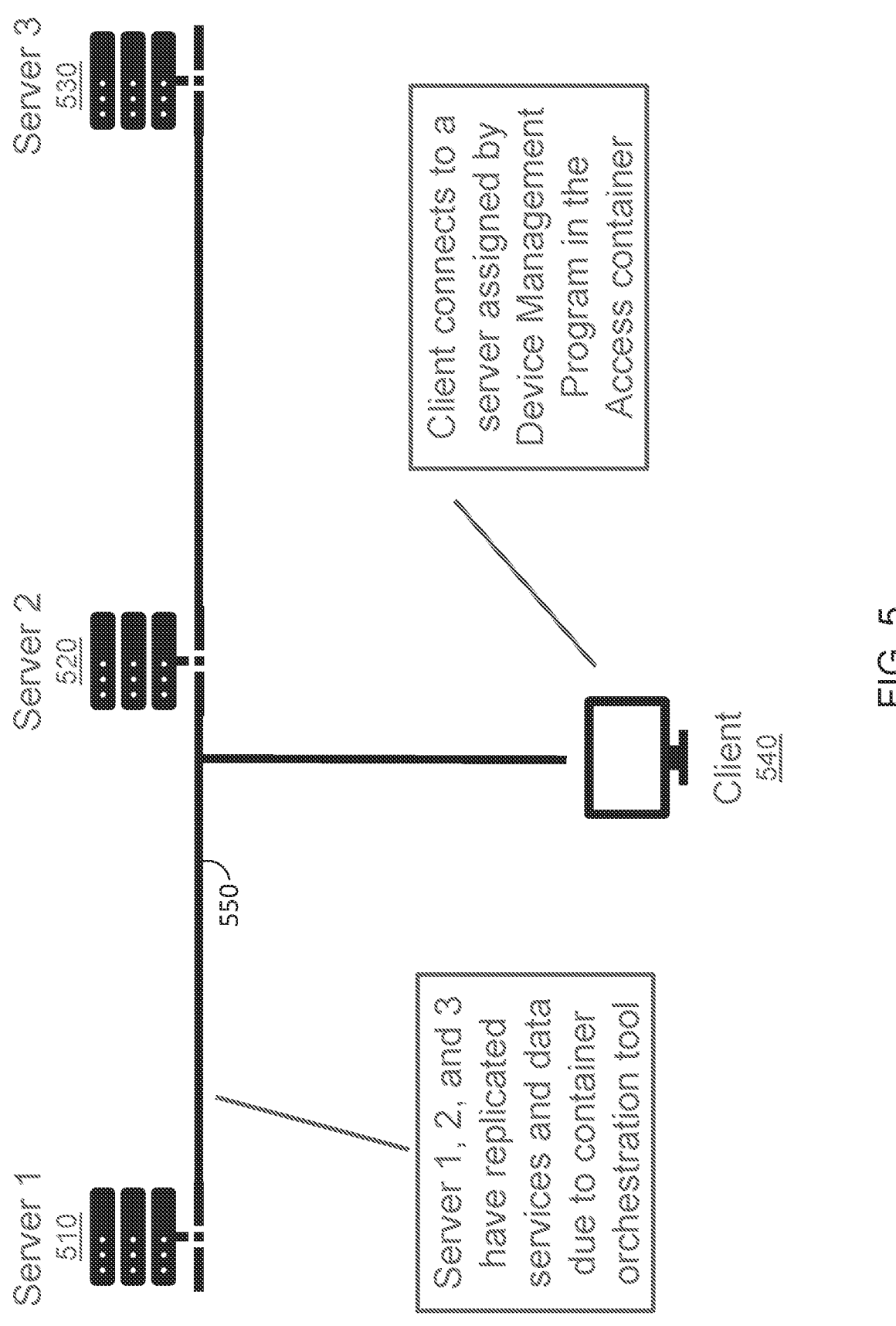
FIG. 5 is a block diagram one possible architecture for a distributed system, in accordance with an embodiment of the present disclosure.

FIG. 5 is a block diagram one possible architecture for a distributed system, in accordance with an embodiment of the present disclosure. This is another example of the system illustrated in FIG. 1 above. Here client 540 is connected via network 550 to one or more of server-1 510, server-2 520, and server-3 530. In the illustrative example embodiment of FIG. 5, server-1 510, server-2 520, and server-3 530 have replicated services and data due to the container orchestration tool, and a client connects to a server assigned by the device management program in the access container.

Figure 6:
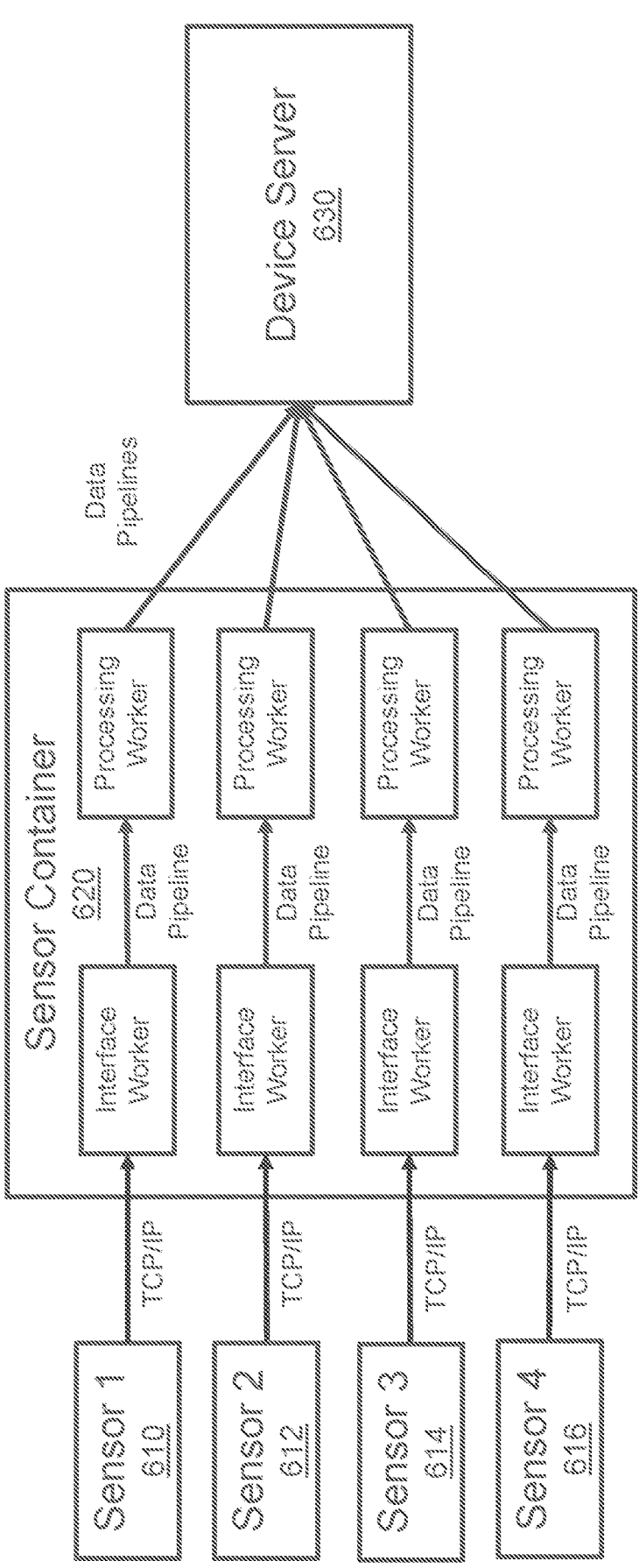
FIG. 6 is an example block diagram of one server of a distributed system, in accordance with an embodiment of the present disclosure.

FIG. 6 is an example block diagram of one server of a distributed system, in accordance with an embodiment of the present disclosure. Here sensor-1 610, sensor-2 612, sensor-3 614, and sensor-4 616 are communicatively coupled to sensor container 620 by, for example, a Transmission Control Protocol/Internet Protocol (TCP/IP) communication link. Sensor container 620 is the conduit between the monitored devices, which in this example are all sensors, to the device server 630. Device server 630 may be, for example, computing device-1 110, computing device-2 120, or computing device-N 130 from FIG. 1 above. The sensor container 620 includes sensor containers which are specific to each sensor and contains configuration data for each sensor. The interface worker receives raw data from the communication channel and sends it to the sensor's internal message queue. The processing worker processes the message queue data and generates device readings, events, alerts, and warnings. The sensor container is deployed per the hardware, i.e., there are no shared containers.

Figure 7:
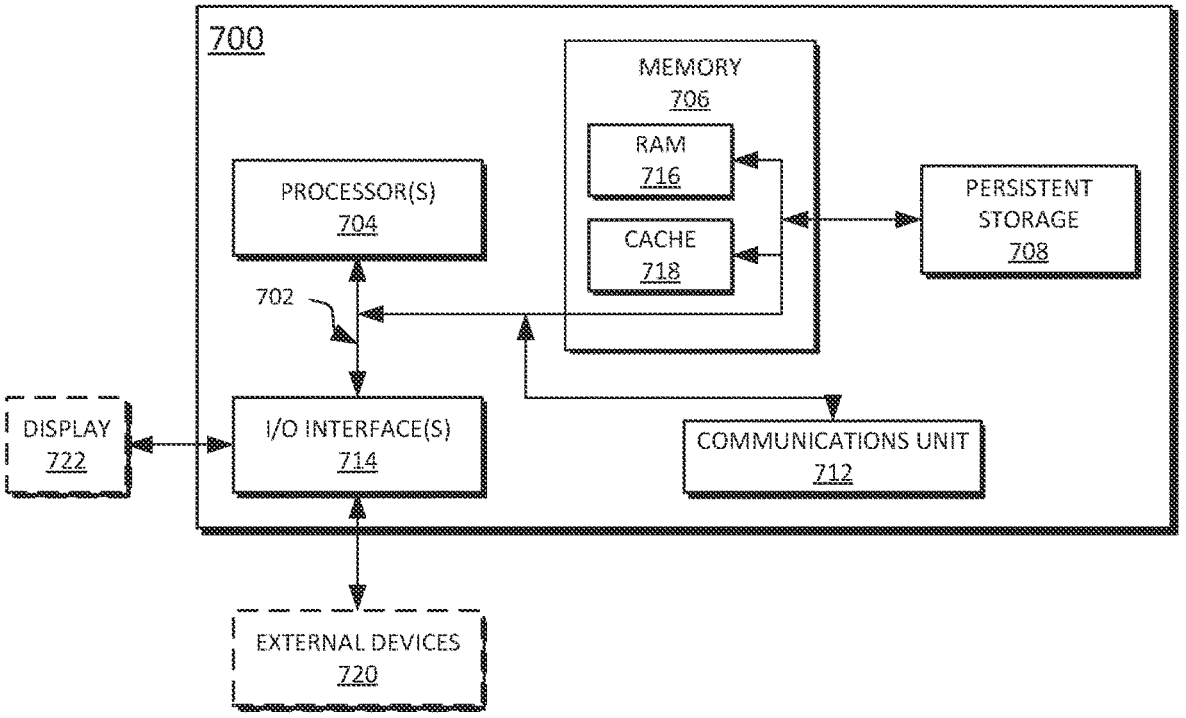
FIG. 7 depicts a block diagram of components of the computing device executing the device management program within the distributed data processing environment of FIG. 1, in accordance with an embodiment of the present disclosure.

FIG. 7 depicts a block diagram of components of the computing device executing the device management program within the distributed data processing environment of FIG. 1, in accordance with an embodiment of the present disclosure. FIG. 7 displays the computing device or computer 700, one or more processor(s) 704 (including one or more computer processors), a communications fabric 702, a memory 706 including, a random-access memory (RAM) 716 and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the processor(s) 704, memory 706, persistent storage 708, communications unit 712, and input/output (I/O) interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are non-transitory computer readable storage media. In the depicted embodiment, the memory 706 comprises a RAM 716 and a cache 718. In general, the memory 706 can include any suitable volatile or non-volatile non-transitory computer readable storage media. Cache 718 is a fast memory that enhances the performance of processor(s) 704 by holding recently accessed data, and near recently accessed data, from RAM 716.

Program instructions for the device management program 112 may be stored in the persistent storage 708, or more generally, any non-transitory computer readable storage media, for execution by one or more of the respective processors 704 via one or more memories of the memory 706. The persistent storage 708 may be a magnetic hard disk drive, a solid-state disk drive, a semiconductor storage device, flash memory, read only memory (ROM), electronically erasable programmable read-only memory (EEPROM), or any other non-transitory computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another non-transitory computer readable storage media that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present disclosure, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s)

720 can also include portable non-transitory computer readable storage media such as, for example, thumb drives, portable optical or magnetic disks, and memory cards. Software and data used to practice embodiments of the present disclosure, e.g., the device management program 112, can be stored on such portable non-transitory computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

Machine learning (ML) is an application of AI that creates systems that have the ability to automatically learn and improve from experience. ML involves the development of computer programs that can access data and learn based on that data. ML algorithms typically build mathematical models based on sample, or training, data in order to make predictions or decisions without being explicitly programmed to do so. The use of training data in ML requires human intervention for feature extraction in creating the training data set. The two main types of ML are Supervised learning and Unsupervised learning. Supervised learning uses labeled datasets that are designed to train or "supervise" algorithms into classifying data or predicting outcomes accurately. Supervised learning is typically used for problems requiring classification or regression analysis. Classification problems use an algorithm to accurately assign test data into specific categories. Regression is a method that uses an algorithm to understand the relationship between dependent and independent variables. Regression models are helpful for predicting numerical values based on different data points.

Unsupervised learning uses machine learning algorithms to analyze and cluster unlabeled datasets. These algorithms discover hidden patterns or data groupings without the need for human intervention, and their ability to discover similarities and differences in information make unsupervised learning the ideal solution for exploratory data analysis, cross-selling strategies, customer segmentation, and image recognition. Unsupervised learning is typically used for problems requiring clustering, e.g., K-means clustering, or association, which uses different rules to find relationships between variables in a given dataset.

Deep learning is a sub-field of ML that automates much of the feature extraction, eliminating some of the manual human intervention required and enabling the use of larger data sets. Deep learning typically uses neural networks, which are highly interconnected entities, called nodes. Each node, or artificial neuron, connects to another and has an associated weight and threshold. A node multiplies the input data with the weight, which either amplifies or dampens that input, thereby assigning significance to inputs with regard to the task the algorithm is trying to learn. If the output of any individual node is above the specified threshold value, that node is activated, sending data to the next layer of the network. Otherwise, no data is passed along to the next layer of the network. A neural network that consists of more than three layers can be considered a deep learning algorithm or a deep neural network.

According to one aspect of the disclosure there is thus provided a system for non-disruptive system enhancements and integrations, the system including: one or more computer processors; one or more computer readable storage media; and program instructions stored on the one or more computer readable storage media for execution by at least one of the one or more computer processors. The stored program instructions including instructions to: connect one or more devices to the system, wherein each device of the one or more devices is connected to the system without changing a baseline system code; assign a mode to each device; receive an event from any device of the one or more devices; determine whether each user of one or more users of the system has an appropriate privilege; and send the event to each user of the one or more users that has the appropriate privilege.

According to another aspect of the disclosure there is thus provided a computer-implemented method for non-disruptive system enhancements and integrations, the computer-implemented method including: connecting, by one or more computer processors, one or more devices to a system, wherein each device of the one or more devices is connected to the system without changing a baseline system code; assigning, by the one or more computer processors, a mode to each device; receiving, by the one or more computer processors, an event from any device of the one or more devices; determining, by the one or more computer processors, whether each user of one or more users of the system has an appropriate privilege; and sending, by the one or more computer processors, the event to each user of the one or more users that has the appropriate privilege.

According to yet another aspect of the disclosure there is thus provided a system for non-disruptive system enhancements and integrations, the system including: one or more server computers, wherein each server computer of the one or more server computers further comprises: one or more computer processors; a cluster management tool; a container orchestration tool; one or more computer readable storage media; and program instructions stored on the one or more computer readable storage media for execution by at least one of the one or more computer processors. The stored program instructions including instructions to: connect one or more devices to the system, wherein each device of the one or more devices is connected to the system without changing a baseline system code; assign a mode to each device; receive an event from any device of the one or more devices; determine whether each user of one or more users of the system has an appropriate privilege; and send the event to each user of the one or more users that has the appropriate privilege.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include non-transitory computer readable storage media having computer readable program instructions thereon for causing a processor to carry out aspects of the present disclosure.

The non-transitory computer readable storage media can be any tangible device that can retain and store instructions for use by an instruction execution device. The non-transitory computer readable storage media may be, for example, but is not limited to, an electronic storage device, a magnetic storage device, an optical storage device, an electromagnetic storage device, a semiconductor storage device, or any suitable combination of the foregoing. A non-exhaustive list of more specific examples of the non-transitory computer readable storage media includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a non-transitory computer readable storage media or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a non-transitory computer readable storage media within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or other programmable logic devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a non-transitory computer readable storage media that can direct a computer, a programmable data processing apparatus, and/or other devices to function in a particular manner, such that the non-transitory computer readable storage media having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for non-disruptive system enhancements and integrations, the system comprising:
   one or more devices;
   one or more computer processors;

a decision engine, the decision engine configured to use artificial intelligence to determine whether changes should be made to the system and an appropriate state for the system to display for each user of one or more users of the system and each device of said one or more devices based on:

at least one of a set of roles and a set of privileges, and a mode of each device of said one or more devices, wherein the mode controls functional capabilities of each device of the one or more devices, the mode being one of a normal mode, integration mode, or a maintenance mode;

one or more computer readable storage media; and program instructions stored on the one or more computer readable storage media for execution by at least one of the one or more computer processors, the stored program instructions including instructions to:

connect said one or more devices to the system, wherein each device of the one or more devices is connected to the system without changing a baseline system code;

assign one of said modes to each device of the one or more devices to establish an assigned mode for each device, wherein the assigned mode determines available functions of each device of the one or more devices within the system;

receive an event from any device of the one or more devices;

determine, by the decision engine, whether each user of the one or more users of the system has an appropriate privilege based in part on the assigned mode of the device from which an event is received, wherein different modes of each device of the one or more devices result in different privilege determinations; and send the event to each user of the one or more users that has the appropriate privilege.

2. The system of claim 1, wherein any device of the one or more devices may be modified without changing the baseline system code.

3. The system of claim 1, wherein each device of the one or more devices contain a settings payload, wherein the settings payload allows the one or more users to add the one or more devices to a running system in real time.

4. The system of claim 1, wherein each device of the one or more devices include a device definition, wherein the device definition is defined using metadata to describe an input and output capabilities of the device along with one or more settings and commands for each device.

5. The system of claim 4, wherein the metadata is registered to a core system causing the device to dynamically appear in a user interface of a client.

6. The system of claim 1, wherein each device of the one or more devices contain a data payload, wherein the data payload allows each device to configure any amount of data to be displayed on a user interface of a client.

7. The system of claim 6, wherein the data payload is defined using special metadata properties.

8. The system of claim 1, wherein assign the mode to each device comprises one or more of the following program instructions, stored on the one or more computer readable storage media, to:

assign the mode to each device, system input, or system output; and attach the mode to the event sent from any device of the one or more devices.

9. A computer-implemented method for non-disruptive system enhancements and integrations, the computer-implemented method comprising:

connecting, by one or more computer processors, one or more devices to a system, wherein each device of the one or more devices is connected to the system without changing a baseline system code;

assigning, by the one or more computer processors, a mode to each device of the one or more devices, wherein the mode controls functional capabilities of each device of the one or more devices, the mode being one of a normal mode, integration mode, or a maintenance mode;

receiving, by the one or more computer processors, an event from any device of the one or more devices;

determining, by the one or more computer processors, an appropriate privilege for each user of one or more users of the system for each device based on at least one of a set of roles and a set of privileges and the mode of each device, wherein different modes of each device of the one or more devices result in different privilege determinations, wherein the appropriate privilege for each user is determined using a decision engine, the decision engine configured to use artificial intelligence; and sending, by the one or more computer processors, an appropriate state for the system to display to each user of the one or more users based on the appropriate privilege.

10. The computer-implemented method of claim 9, wherein any device of the one or more devices may be modified without changing the baseline system code.

11. The computer-implemented method of claim 9, wherein each device of the one or more devices contain a settings payload, wherein the settings payload allows the one or more users to add the one or more devices to a running system in real time.

12. The computer-implemented method of claim 9, wherein each device of the one or more devices include a device definition, wherein the device definition is defined using metadata to describe an input and output capabilities of the device along with one or more settings and commands for each device.

13. The computer-implemented method of claim 12, wherein the metadata is registered to a core system causing the device to dynamically appear in a user interface of a client.

14. The computer-implemented method of claim 9, wherein each device of the one or more devices contain a data payload, wherein the data payload allows each device to configure any amount of data to be displayed on a user interface of a client.

15. The computer-implemented method of claim 14, wherein the data payload is defined using special metadata properties.

16. The computer-implemented method of claim 9, wherein assign the mode to each device comprises:

assigning, by the one or more computer processors, the mode to each device, system input, or system output; and attaching, by the one or more computer processors, the mode to the event sent from any device of the one or more devices.

17. A system for non-disruptive system enhancements and integrations, the system comprising:

one or more devices;

one or more server computers, wherein each server computer of the one or more server computers further comprises:

one or more computer processors;

a cluster management tool;

a container orchestration tool;

a decision engine, the decision engine configured to use artificial intelligence to determine whether changes should be made to the system and an appropriate state for the system to display for each user of one or more users of the system and each device of said one or more devices based on at least one of a set of roles and a set of privileges and a mode of each device of said one or more devices, wherein the mode controls functional capabilities of each device of the one or more devices, the mode being one of a normal mode, integration mode, or maintenance mode;

one or more computer readable storage media; and program instructions stored on the one or more computer readable storage media for execution by at least one of the one or more computer processors, the stored program instructions including instructions to:

connect said one or more devices to the system, wherein each device of the one or more devices is connected to the system without changing a baseline system code;

assign one of said modes to each device of the one or more devices to establish an assigned mode for each device, wherein the assigned mode determines available functions of each device of the one or more devices within the system;

receive an event from any device of the one or more devices;

determine, by the decision engine, whether each user of one or more users of the system has an appropriate privilege based in part on the assigned mode of the device from which an event is received, wherein different modes of each device of the one or more devices result in different privilege determinations; and send the event to each user of the one or more users that has the appropriate privilege.

18. The system of claim 17, further comprising one or more of the following program instructions, stored on the one or more computer readable storage media, to:

responsive to detecting a server computer of the one or more server computers has gone down, move all available connections to an active server.

19. The system of claim 17, further comprising one or more sensor containers, wherein the one or more sensor containers are specific to the system and contain configuration data for each sensor in the system.

20. The system of claim 17, wherein the one or more server computers have replicated services and data due to the container orchestration tool.

* * * * *